J. A. DU LANEY.
BAND SAW.
APPLICATION FILED APR. 2, 1918.
1,296,488.
Patented Mar. 4, 1919.
2 SHEETS—SHEET 1.
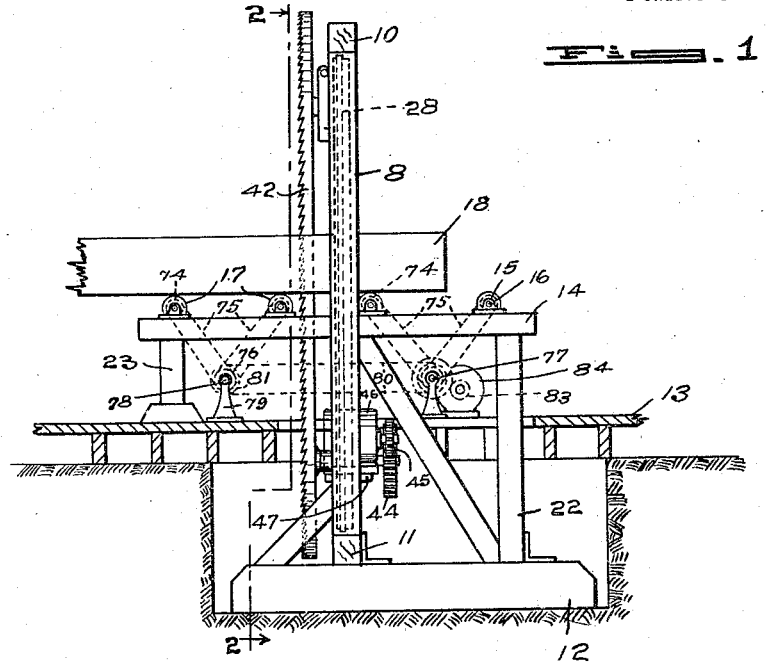
Fig. 1
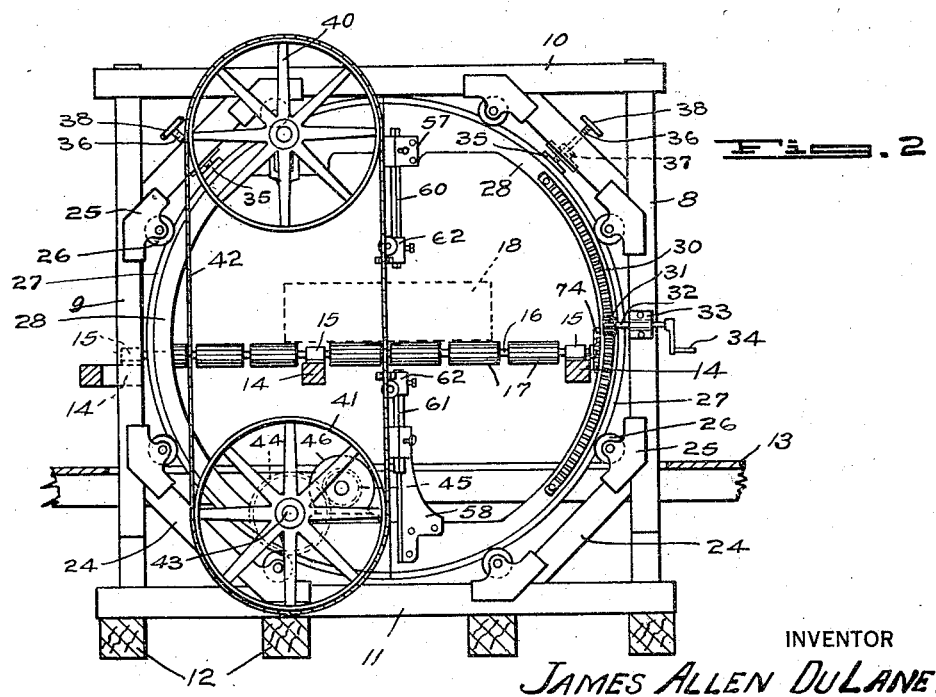
Fig. 2
INVENTOR
JAMES ALLEN DULANEY
BY
ATTORNEY J. A. DU LANEY.
BAND SAW.
APPLICATION FILED APR. 2, 1918.
1,296,488.
Patented Mar. 4, 1919.
2 SHEETS—SHEET 2.
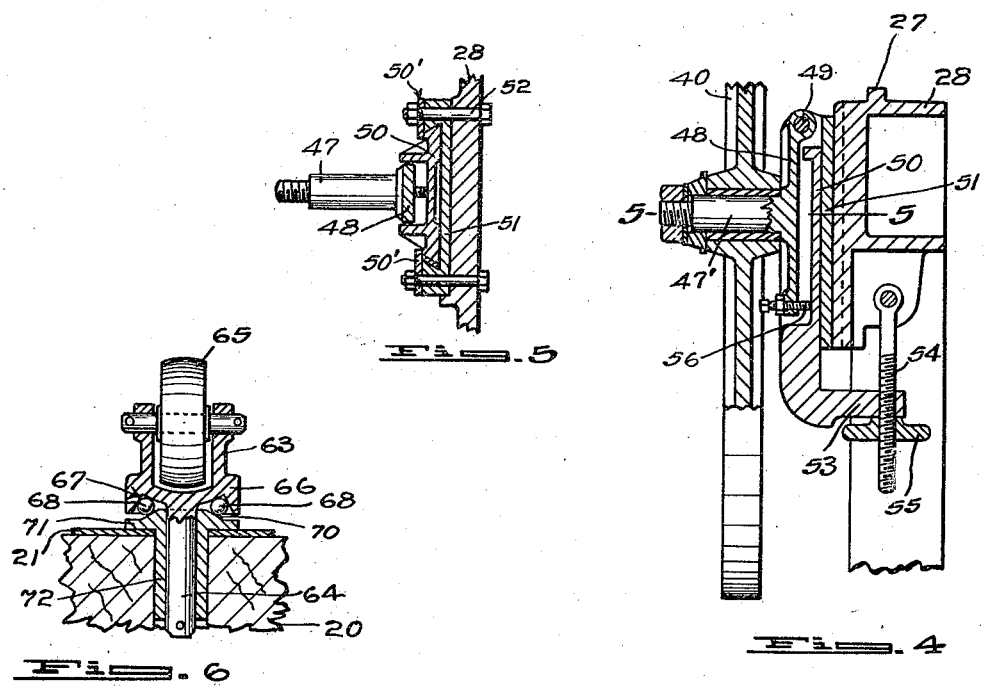
INVENTOR
JAMES ALLEN DU LANEY
BY
Horace Barnes
ATTORNEY

UNITED STATES PATENT OFFICE.

JAMES ALLEN DU LANEY, OF SEATTLE, WASHINGTON.

BAND-SAW.

1,296,488.  Specification of Letters Patent.  Patented Mar. 4, 1919.

Application filed April 2, 1918. Serial No. 226,148.

*To all whom it may concern:*

Be it known that I, JAMES ALLEN DU LANEY, a citizen of the United States, residing in Seattle, in the county of Kings and State of Washington, (whose post-office address is 159 Melrose ave. No., said Seattle,) have invented a new and useful Improvement in Band-Saws, of which the following is a full and clear specification.

This invention relates to improvements in tilting band saws.

The object of this improvement is to provide a band saw of relatively cheap and simple construction wherein the saw itself is mounted on a movable circular frame so that it may be turned into various angular positions to make a beveled cut on a piece of timber that is fed to the saw on a set of horizontal rolls.

A further object is to provide a normally operative set of feed rolls for advancing a timber to the saw in a straight line and casters that may be inserted in the frame to support a timber above the feed rolls and permit it to be manually advanced to the saw to make a cut on a curved line.

Other objects will be apparent from the following description considered in the light of the accompanying drawings.

The invention consists in the novel construction, adaptation and combination of parts of a band saw as will be more clearly hereinafter described and claimed.

In the accompanying drawings, Figure 1 is a view in side elevation of a band saw constructed in accordance with this invention; Fig. 2 is a view in vertical cross section substantially on the broken line 2—2 of Fig. 1, certain parts being shown in elevation. Fig. 3 is a plan view of the device. Fig. 4 is a fragmentary vertical sectional view. Fig. 5 is a detail section substantially on broken line 5—5 of Fig. 4; and Fig. 6 is a view in vertical section of a caster embodied in the invention.

In the construction of large wooden ships it is often necessary, owing to the curvature of the sides of the vessel to cut the timbers of which the ribs are formed on a bevel, or to cut them so that the adjacent side faces are not at right angles to each other so that the planking on the outside and inside of the ship will fit more squarely against the surfaces of the ribs. It is also necessary to cut certain portions of these ribs on a curve to give the proper shape to the sides of the ship.

This saw is designed especially for use on heavy timbers that are to be cut in any shape other than straight and square, and is arranged so that the saw blade may be turned at an angle to the plane of the rolls over which the timber is fed to the saw to thereby cut the timbers on a bevel. Provision is also made for supporting the timbers on ball bearing casters above the surface of the rolls so that the timber may be manually advanced to the saw and guided so that they are cut on curved lines.

Referring to the drawings, throughout which like reference numerals designate like parts the numerals 8 and 9 designate the two sides of a rectangular frame that are connected at their top ends by a top piece 10 and at their bottom ends a bottom piece 11 that rests upon and is supported by timbers 12 that may be disposed below the floor or platform 13 from which the saw is operated.

Disposed in a horizontal plane at a convenient distance above the floor 13 and secured to the side members 8 and 9 are frame pieces 14 that serve as supports for journal boxings 15 for transverse shafts 16 whereon are mounted feed rollers 17 that are provided with serrated surfaces to engage with and move a timber 18 that is to be sawed.

The frame pieces 14 are connected at frequent intervals by transverse frame pieces 20 that preferably each have relatively thin metal plates 21 provided on the top sides thereof, as more clearly shown in Fig. 6, and are perforated for the reception of the shanks of caster wheels hereinafter described.

The horizontal frame pieces are supported at their outer ends by vertical posts 22 and 23 that may rest upon the timbers 12 and floor 13 respectively, as shown in Fig. 1.

The four corners of the upright frame formed by the members 8, 9, 10 and 11 are provided with internally disposed angular braces 24 that serve to strengthen the frame structure and coöperate with the frame members at the location of their intersection therewith to form supports for brackets 25 wherein are mounted grooved rollers 26 that are adapted for the reception of a track 27 on the periphery of a large circular saw frame or ring member 28. The rollers 26 thus serve to support the ring member 28 for rotation about a central axis.

The ring member 28 will preferably be constructed in two semi-circular pieces to facilitate casting the same, the line of division of the two parts in the position shown in Fig. 2 being on a vertical plane passing through the center of the ring.

The ring member 28 is provided on one side with an annular rack 30 that is adapted to be engaged by a pinion 31 on a shaft 32 that is journaled in a bearing bracket 33 on the frame member 8 and adapted to be rotated by a crank 34 to turn the ring member 28 within the rollers.

The ring member 28 is adapted to be engaged near the upper peripheral portion by brake shoes 35 that are swiveled on the ends of screws 36 that pass through threaded plates 37 secured to the angular brace members 24 and are provided with hand wheels 38 by which they may be turned to move them into and out of engagement with the ring member.

Mounted upon the upper and lower portions of the ring member 28 are two saw wheels 40 and 41 respectively that are adapted to carry a band saw 42, the saw wheels being positioned on the ring member so that the operative side of the band saw will lie in a diametrical plane that passes through the center of the ring member.

The lower saw wheel 41 is fixedly secured on a shaft 43 that is journaled in a suitable boxing on the ring member 28 and is provided with a fixedly mounted gear wheel 44 that is adapted to mesh with a pinion 45 on the shaft of a motor 46.

The motor 46 is fixedly secured to and carried on a shelf 47 on the ring member 28 and is movable therewith.

The upper saw wheel 40 is rotatably mounted on a bearing stud 47', see Figs. 4 and 5, on a plate 48 that is connected at its top end by a pivot 49 with a vertically movable member 50 that is dovetailed into a suitably recessed block 51 which is fixedly secured to the ring member 28 by bolts 52. The member 50 may be rigidly clamped in the block 51 by plates 50' that are held by the bolts 52 as more clearly shown in Fig. 5.

The lower end of the member 50 is turned inwardly as at 53 and perforated to permit the passage of a screw 54 that is pivotally secured to the ring member 28 and is provided with a hand wheel 55 by means of which the member 50 may be raised in an obvious manner to tighten the band saw.

The lower end of the plate 48 is provided with a set screw 56 that engages with the front wall of the member 50 and by which the inclination of the saw wheel 40 may be varied.

The upper and lower portions of the ring member 28 are provided with brackets 57 and 58 respectively within which are mounted adjustably disposed shanks 60 and 61 that carry saw guides 62 of the usual form of construction that engage with and steady the band saw at points above and below the piece of timber that is being sawed.

The casters, shown in Fig. 6 each comprise a bifurcated bracket 63 having a centrally disposed shank 64 and adapted for the reception of a caster wheel 65. The base of the bracket is flanged as at 66 and the under side of such flange is provided with a ball race 67 for the reception of balls 68. The balls 68 rest on the inclined top surface 70 of a flange 71 on the top of a sleeve 72 that fits over the caster shank 64.

The casters are adapted to be easily inserted in, and removed from, perforations 73 in the plates 21 and frame pieces 20.

The feed rollers are each provided on one end with sprocket wheels 74 that are engaged by sprocket chains 75 that pass around other sprocket wheels 76 on shafts 77 and 78 that are mounted in bearing brackets 79.

The two shafts 77 and 78 are connected with each other by a sprocket chain 80 that passes over suitable sprocket wheels indicated by dotted lines 81 and the shaft 77 is provided with a gearwheel 82 that meshes with a pinion 83 on the shaft of a motor 84 whereby the rollers will all be driven in the same direction and at the same rate of speed.

The saw is shown in a vertical position in Fig. 2 of the drawings and when in such position is adapted for making a cut at right angles to the plane of the feed rollers over which the timber is advanced.

When it is desired to make a beveled cut on the side of a timber the brake shoes 35 are withdrawn and the saw frame ring 28 is turned by means of the rack and pinion to adjust the saw 42 to any desired angle so that the plane of the surface of the timber that is cut by the saw 42 will be at an angle that is greater or less than a right angle to the plane of the bottom surface of the timber that rests on the feed rollers.

If it is desired to cut the timber on a curved line and at any angle either perpendicular or inclined with respect to the plane of the feed rollers a plurality of the casters shown in Fig. 6 may be inserted in the perforations 73 in the frame pieces 20 and the timber may be manually advanced and guided to the saw.

It is obvious that changes in the precise form of construction and arrangement of parts of this device may be resorted to within the scope of the following claim.

What I claim is—

A saw of the class described comprising an upright supporting frame, an open annular saw frame disposed within said supporting frame, a circular track on the periphery of said annular saw frame, a plurality of flanged rollers rotatably mounted on said supporting frame for the reception of said track whereby said annular saw frame may be rotated about a central axis, brake shoes engaging said track, saw carrying wheels mounted for rotation on said annular saw frame, a band saw carried by said saw wheels, the said saw wheels being located so that the cutting edge of said band saw will pass through the center of said annular frame, a motor mounted on said annular saw frame and movable therewith for driving the lowermost one of said saw wheels, means for rotating said annular saw frame, adjustable saw guides carried by said annular saw frame, a supporting table disposed at right angles to said upright supporting frame, and extending through said annular saw frame, a plurality of feed rollers mounted for rotation on said table, and power actuated means for driving said feed rollers to advance timbers to said saw.

Signed at Seattle, Wash., this 25th day of March, 1918.

JAMES ALLEN DU LANEY.

Copies of this patent may be obtained for five cents each, by addressing the "Commissioner of Patents, Washington, D. C."